(12) United States Patent
Jimenez Santillana et al.

(10) Patent No.: US 10,531,615 B2
(45) Date of Patent: Jan. 14, 2020

(54) MODULAR CONTAINER AND MODULAR IRRIGATION SYSTEM

(71) Applicant: TIEMPO LIBRE GRANADA, S.L., Granada (ES)

(72) Inventors: Jose Luis Jimenez Santillana, Granada (ES); Manuel Vidal Cobos Rodriguez, Granada (ES)

(73) Assignee: Tiempo Libre Granada, S.L., Granada (ES)

( * ) Notice: Subject to any disclaimer, the term of this patent is extended or adjusted under 35 U.S.C. 154(b) by 82 days.

(21) Appl. No.: 15/318,329

(22) PCT Filed: Feb. 11, 2015

(86) PCT No.: PCT/ES2015/070086
§ 371 (c)(1),
(2) Date: Dec. 12, 2016

(87) PCT Pub. No.: WO2015/197889
PCT Pub. Date: Dec. 30, 2015

(65) Prior Publication Data
US 2017/0112073 A1 Apr. 27, 2017

Related U.S. Application Data

(63) Continuation-in-part of application No. PCT/ES2014/070493, filed on Jun. 13, 2014.

(30) Foreign Application Priority Data

Jun. 13, 2014 (ES) .................................. 201430905
Jan. 28, 2015 (ES) .................................. 201530108

(51) Int. Cl.
*A01G 9/02* (2018.01)
*A01G 9/029* (2018.01)
(Continued)

(52) U.S. Cl.
CPC .............. *A01G 9/029* (2018.02); *A01C 21/00* (2013.01); *A01G 9/0295* (2018.02); *A01G 27/00* (2013.01); *B65D 21/0209* (2013.01)

(58) Field of Classification Search
CPC ........ A01G 9/022; A01G 9/023; A01G 9/028; A01G 9/0295; A01G 27/00; A01G 27/005;
(Continued)

(56) References Cited

U.S. PATENT DOCUMENTS 2,713,752 A * 7/1955 Sobol ..................... A01G 27/00
                                                                47/80
3,137,096 A * 6/1964 Hopkins ................. A01G 27/00
                                                                47/79
(Continued)

FOREIGN PATENT DOCUMENTS

ES          2048115          3/1994

OTHER PUBLICATIONS

International Search Report issued in application No. PCT/ES2015/070086 dated Mar. 11, 2015.
(Continued)

*Primary Examiner* — Lisa L Tsang
(74) *Attorney, Agent, or Firm* — Knobbe, Martens, Olson & Bear, LLP (57) ABSTRACT

A modular container or irrigation module, as well as a modular irrigation system obtained by arranging at least two of said modules. The proposed modular irrigation system comprises at least two irrigation modules of the invention, and by stacking the modules vertically, the system can be used to form a continuous-flow irrigation system in which excess irrigation water is recirculated and evaporation losses can be minimized. Similarly, the module and the system of the invention can be used to form a sustainable construction (Continued)

system in which multiple irrigation systems are arranged to form various architectural elements, such as green walls, green columns, vertical gardens and the like.

18 Claims, 6 Drawing Sheets

(51) Int. Cl.
*A01C 21/00* (2006.01)
*A01G 27/00* (2006.01)
*B65D 21/02* (2006.01)

(58) Field of Classification Search
CPC ...... A01G 27/006; A01G 27/02; A01G 27/04; A01G 27/06; A01G 2031/006; A01G 31/00; A01G 31/02; A01G 31/06; A01G 9/029
USPC .................... 47/62 R, 62 E, 82, 83, 86, 48.5
See application file for complete search history.

(56) References Cited

U.S. PATENT DOCUMENTS

| | | | | |
|---|---|---|---|---|
| 3,243,919 A * | 4/1966 | Carlson | ................. | A01G 27/00 47/79 |
| 3,841,023 A * | 10/1974 | Carlyon, Jr. | ........... | A01G 9/023 239/20 |
| 4,006,559 A * | 2/1977 | Carlyon, Jr. | ........... | A01G 9/023 137/575 |
| 4,594,811 A * | 6/1986 | Tokoro | .................. | A01G 31/06 47/65 |
| 5,309,671 A * | 5/1994 | Byun | ..................... | A01G 9/023 47/71 |
| 5,404,672 A * | 4/1995 | Sanderson | ............. | A01G 9/023 47/39 |
| 6,470,625 B1 * | 10/2002 | Byun | ..................... | A01G 9/023 47/82 |
| 7,055,282 B2 * | 6/2006 | Bryan, III | .............. | A01G 31/06 47/62 R |
| 7,516,574 B2 * | 4/2009 | Gottlieb | ................. | A01G 9/023 47/62 R |
| D653,156 S * | 1/2012 | Phelps | ......................... | D11/143 |
| 9,839,183 B2 * | 12/2017 | Chang | .................. | A01G 27/005 |
| 2006/0162252 A1 * | 7/2006 | Lim | ..................... | A01G 31/045 47/59 R |
| 2009/0000189 A1 * | 1/2009 | Black | .................... | A01G 27/02 47/82 |
| 2010/0146854 A1 * | 6/2010 | Cannon | ................. | A01G 9/023 47/82 |
| 2010/0287833 A1 * | 11/2010 | Keats | ................... | B65D 21/043 47/81 |
| 2012/0198767 A1 * | 8/2012 | Hansen | .................. | A01G 27/04 47/81 |
| 2013/0111812 A1 * | 5/2013 | Fisher | .................... | A01G 9/023 47/66.7 |
| 2015/0128494 A1 * | 5/2015 | Peterson | ................ | A01G 9/023 47/82 |

OTHER PUBLICATIONS

Written Opinion issued in application No. PCT/ES2015/070086 dated Nov. 3, 2015.

* cited by examiner

MODULAR CONTAINER AND MODULAR IRRIGATION SYSTEM

This application is the U.S. National Phase under 35 U.S.C. § 371 of International Application No. PCT/ES2015/070086, filed Feb. 11, 2015, designating the U.S., and published in Spanish as WO 2015/197889 A1 on Dec. 30, 2015, which is a continuation in part of International Application No. PCT/ES2014/070493, filed Jun. 13, 2014; and claims priority to Spanish Patent Application No. P201430905, filed Jun. 13, 2014 and Spanish Patent Application No. P201530108, filed Jan. 28, 2015, the entire contents of which are incorporated herein by reference.

BACKGROUND OF THE INVENTION

Field of the Invention

The present invention relates to a modular irrigation container as well as to a modular irrigation system obtained by arranging at least two of said modular containers. The proposed modular irrigation system comprises at least two modular irrigation containers (hereinafter modules) of the invention, and by stacking the modules vertically, the system can be used to form a continuous-flow irrigation system in which excess irrigation water is recirculated, and evaporation losses can be minimized. Similarly, the module and the system of the invention can be used to form a sustainable construction system in which multiple irrigation systems are arranged to form various architectural elements, such as green walls, green columns, vertical gardens and the like.

The module and the modular system of the present invention are not only applicable for localized irrigation, but also for the application of chemical substances, such as fertilizers or soil amendments, along with irrigation water, by means of localized supply to the irrigation head, an application known in the relevant technical field as fertigation.

Description of Related Art

Stackable flowerpot stands or planters, which allow designing vertical gardens or green walls and integrate an automated or autonomous irrigation system based on an arrangement of water collecting pipes and ducts for each of the flowerpot stands or planters, are already known. These known systems involve the installation of pipes connected to the water supply network or the accumulation of water in reservoirs provided for such purpose in the system, which entails installation expenditures and works or the risk of excess moisture that is harmful for plants.

Patent document EP1599087B1, for example, describes an irrigation system for plants comprising at least one elongated plant trough, a main pipe and a plurality of openings in which there are included a plurality of branch pipes connecting the main pipe to the openings (22) distributed in the longitudinal direction and positioned at the bottom of the plant trough, the main pipe furthermore being connected to means for supplying and discharging water, and wherein the moisture level is regulated by means of regulating water pressure in the main pipe.

Patent document ES1028581 describes a modular flowerpot stand formed by a tray with a vertical peripheral flange by way of a rather low partition, said stand being provided in the upper part thereof and emerging towards the outside of a wing area with no edges, there being arranged in the lower area several reinforcements or ribs on which the assembly is placed against the horizontal surface, and said stand having in the inner central area a circular protrusion, on the upper face of which and located at the central point thereof there emerges a frustoconical configuration, several perforated lines acting as water channels of the superposed modules being arranged in the side area in which a step is formed with the base, wherein the modules are configured as a hollow cylinder provided with semicircular flanges communicated with the body, a flange being laterally arranged in the lower area provided with a vertical tab and a notch in which the tab of the flange is fitted for stacking same being arranged in the outer area close to the mouth.

DETAILED DESCRIPTION

The module and the modular system provided by the present invention solve the technical problems that arise and meet the need of offering continuous and consecutive irrigation by means of the stackable modular containers and the vertical modular system, as it allows better water and/or fertilizer utilization, reduces evaporation losses by a high percentage, simplifies irrigation by eliminating ducts and pipes for each and every one of the plants and assures a uniform distribution of water and/or fertilizers for each of them, for example, as a result of the inclusion of water level control means. On the other hand, the module of the invention allows improving the watering and washing of the substrate by means of spraying from its upper part in order to entrain a possible nutrient and concentrated salt saturation in the upper strata, as well as to prevent possible obstructions due to fine roots. Similarly, the module and the modular system allow increasing the number of plants to be cultivated per square meter, maximizing space and saving costs.

In the present description, and in reference to the term "water" in this context, it is used in a non-limiting manner, being generally understood as irrigation water which can optionally include other substances, such as fertilizers, nutrients, soil amendments, etc. Similarly, the terms "irrigation" and "fertigation" will be generally referred to herein as "irrigation" or are used interchangeably.

Therefore, generally, the module of the invention is essentially formed based on a first container intended for housing the desired substrate for the plant and including a reserve reservoir to make the washing of said substrate easier, which has in its peripheral wall one or more side openings, in this last case at different heights of the peripheral wall, for arranging plants or seeds therein and allowing them to grow out into the external environment.

A second container allowing the passage of water to a reserve tank and including barrier means to prevent the passage of roots is arranged inside this first container at the center thereof. A tube with a blind upper end is arranged inside this second container, having in its upper terminal area one or more through holes (4) for the passage of excess water to an element arranged immediately downstream. This first container also includes in its lower base a reserve tank, i.e., a space which keeps the irrigation water separated from the substrate once irrigation ends by means of a drainage grate-like spacer element, preventing direct contact of the irrigation water with the substrate except for absorbent elements or wicks which allow capturing water contained in the reserve tank by capillarity.

The upper part of the first container serves as a support for an element operating as a metering tray and/or as a spacer between two modules, hereinafter spacer element. In order to collect excess water that may arise in the first container, the latter has a water collection tank, the object of which is to allow reusing excess water for a new irrigation either manually or by including a pumping system which allows carrying the water to the highest point of the system.

The module of the invention, being vertically stackable, therefore allows defining a modular system in which the elements and containers described above are stacked vertically on top of one another.

BRIEF DESCRIPTION OF THE DRAWINGS

The invention is described below based on an embodiment thereof and in reference to the attached drawings, in which:

FIG. 3 shows a view of a collection tank.

Although the present description and the drawings show a stackable module according to the invention with an essentially cylindrical outer shape, the invention is not limited to the use of this general shape for the modules, which can have any suitable outer shape.

Figure 1:
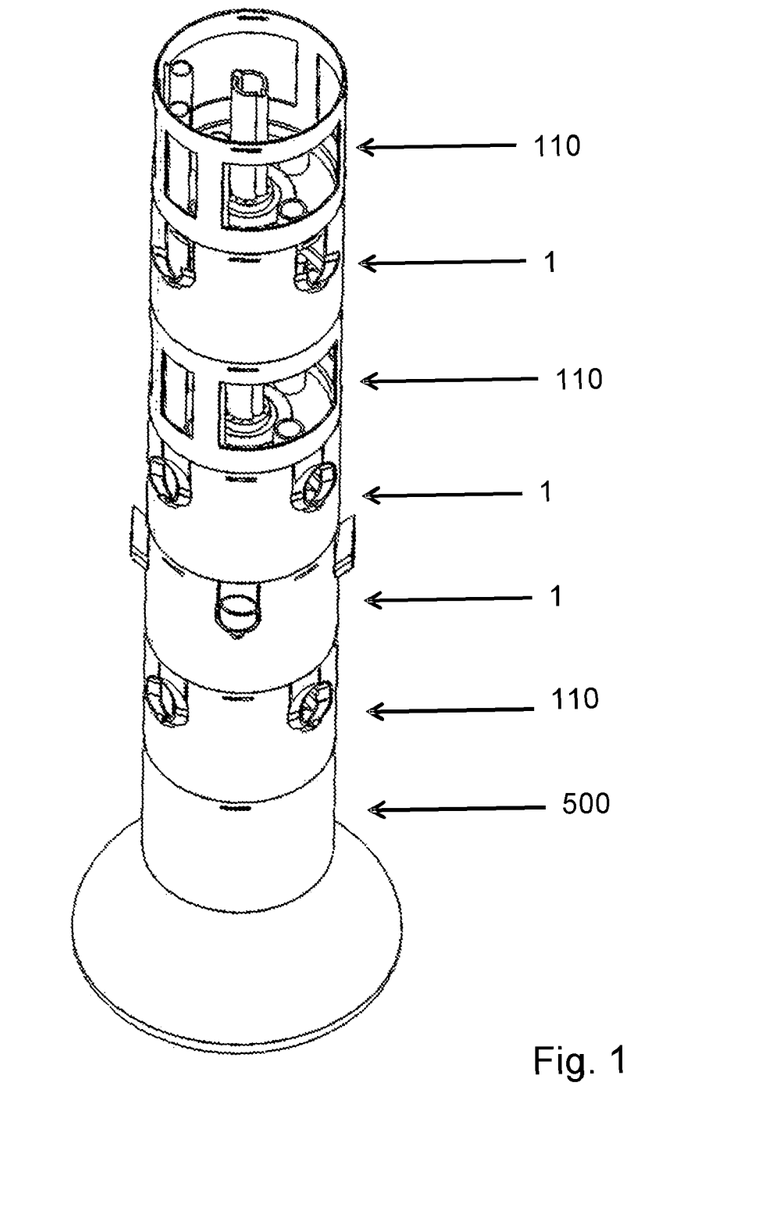
FIG. 1 shows a schematic perspective view of an embodiment of a modular system showing several vertically stackable modules, spacer elements and collection tank according to the invention.

As seen in FIG. 1, each of the modules (1) is formed based on a first container (2) intended for housing the desired substrate for the plant. Said substrate can be any substrate suitable for the growth of the plants to be housed, for example peat, lignocellulosic materials, silica sand, vermiculite, etc., as well as mixtures thereof.

The module (1) also houses therein a second container (8) which has in a preferred embodiment water permeable side walls, a reserve tank (400) and a drainage grate-like spacer element (81) preventing direct contact of the irrigation water with the substrate, except for absorbent elements or wicks which allow capturing water contained in the reserve tank by capillarity.

This first container (2) has in its vertical peripheral wall one or more side openings (3), in this last case at the same or different heights of the peripheral wall, for arranging plants or seeds therein and allowing them to grow out into the external environment. Although the side openings (3) have an essentially oval shape in the embodiment shown in the drawings, such openings may have any suitable shape provided that they perform the function herein described. Some of the side openings (3) can also be used for connecting, by means of bridge-like tubes, several modular systems to one another in order to form meshes, walls or other construction forms or to make it easier to join the systems together using attachment pieces that can be fitted accordingly in such openings.

The upper part of the first container (2) serves as a support for a spacer element (110) connected in a leaktight manner through the lower part thereof to an upper part of the first container (2), which will be described in more detail below.

The central area of the lower base of the container (2) is perforated to allow the passage of water to a second contiguous lower module (1) to which it is connected in a leaktight manner in the case of a modular system with more than one module (1) or to allow possible excess water in the first container (2) to move on to a reserve tank (400) which is essentially an independent space inside the module (2) where water not used by the plant accumulates and which will be described in more detail below.

Figure 2:
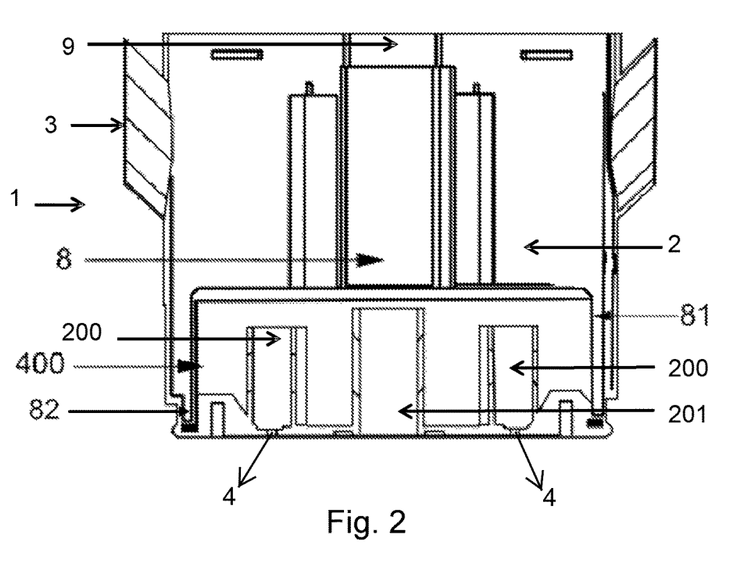
FIG. 2 shows a section view of a module of the invention.

In reference to FIG. 2, inside this first container (2) there is arranged at the center a second container (8) the side walls of which are preferably water permeable. In a preferred embodiment, the permeability of the side walls of the container (8) is achieved by means of holes made in its side wall, or in another preferred embodiment, the side walls of the container (8) are designed in the form of a mesh or barrier to assure said permeability, and they are not limited in terms of the materials from which they are made, provided that the materials allow the passage of water and prevent the passage of roots into the container (8).

This second container (8) vertically has therein, or along one of its side walls, a tube (9) with a blind end in the terminal area of which one or more through holes (not shown) are made along the perimeter. These through holes allow the water to go through the tube (9) directly to the reserve tank (400) when the water level rises inside the container (8) and reaches these holes. The function of the tube (9) is to maintain the maximum water level in the container (8), and if this maximum level is exceeded, it works by draining said container (8), the water moving directly to the reserve tank (400). In this manner, a minimal amount of reserved water is kept at the bottom of the container (2), and the maximum overflow level desired for the second container (8) is controlled.

The second container (8) also allows homogeneously metering the water and/or other substances for the substrate in each of the modules (1), as well as controlling the overflow of direct excess water, a percentage of water that will help to keep the substrate hydrated for a longer time as a result of absorbent elements or wicks which allow capturing water contained in the reserve tank by capillarity being stored in the reserve tank (400).

There are arranged in the lower part of the container (2) of the module (1) through holes (4), distributed throughout the base and projecting vertically into the container (2) by way of vertical tubes (200), the side walls of these vertical tubes (200) being impermeable to the direct passage of water. These vertical tubes (200) therefore determine the maximum water fill level in the reserve tank (400). The height of the water in the vertical tubes (200) defines the maximum fill level, such that the water accumulated therein is available for the plants in this reserve tank (400). The number of vertical tubes (200), their arrangement, as well as their diameter are adapted to the irrigation flow rate to be supplied to the module (1) for the proper operation thereof.

Similarly, there is provided at the base of the container (2) of the module (1) at least one drain hole (201) which, like the through holes (4) described above, projects vertically into the container (2). The height of this at least one drain hole (201) is greater than the height of the vertical tubes (200) such that before going through said drain hole (201), the water comes out through the vertical tubes (200), assuring the proper operation thereof. Therefore, when the water flow rate exceeds the capacity of the vertical tubes (200), the water level continues to rise until the water goes through the at least one drain hole (201) to the next module (1), and the water level will drop to the height of the vertical tubes (200) once irrigation ends, defining a reserve water level in the reserve tank (400).

Figure 5:
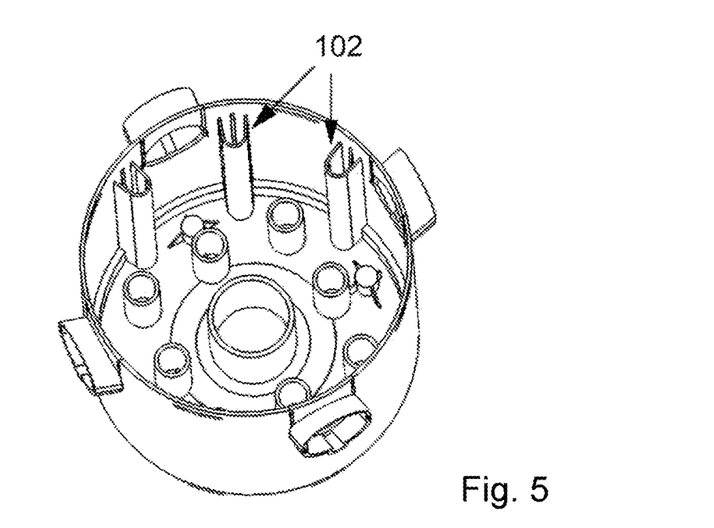
FIG. 5 shows a view of the inside of an irrigation module according to FIG. 1.

As best seen in FIG. 5, to be able to provide the modules (1) with light and to be able to conduct the excess water to the upper part of the modular system, conduction thereof through the inside of the modules (1) is provided by means of conduits (102) with two open ends, preferably having a tubular or semi-tubular section, which are capable of housing elements such as cables, water transport pipes, etc., which allows concealing such elements so that they cannot be seen from outside the module (1) and isolating them from the area in which the substrate is arranged. Such conduits (102) are arranged inside the peripheral walls of the module (1). The lower end of the conduits (102) is integral with the base of the module (1) and does not allow fluid to spill or to pass from inside the module to the next lower module in the case of the modular system, and its vertical length is adapted such that neither the substrate nor the water can overflow it. The number of conduits (102) depends on use requirements, and their arrangement is such that at least two conduits of two vertically stacked modules (1) must be aligned with one another.

Figure 3A:
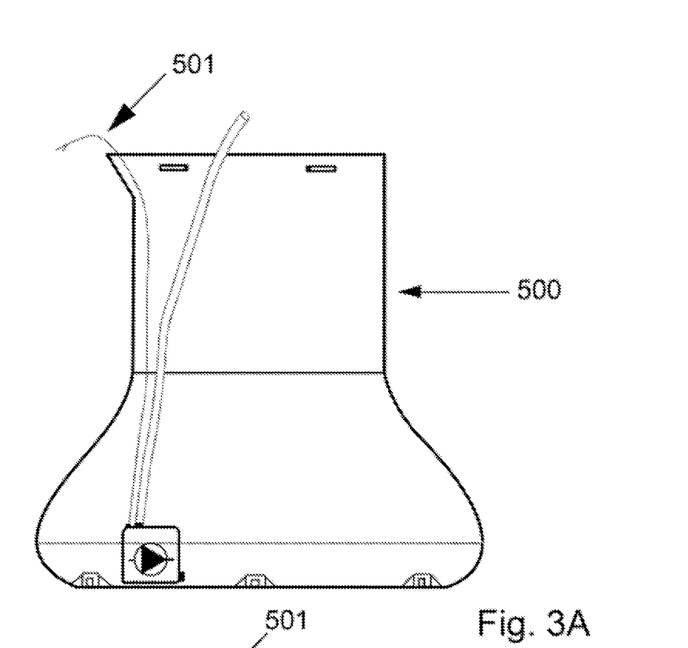
FIG. 3a shows a section view and FIG. 3b) shows an outer view.
Figure 3B:
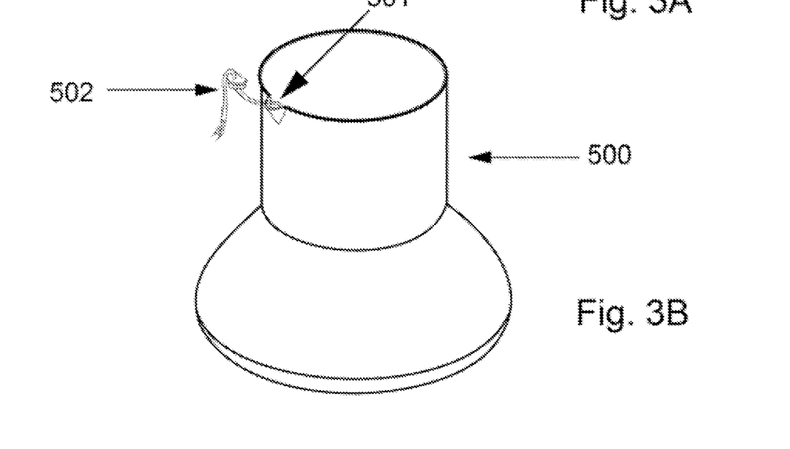

Now in reference to FIG. 3, the collection tank (500) is formed essentially by a reservoir having a shape similar to and compatible with the shape of the module (1). This collection tank (500) is open in its upper part and at least partially closed in its lower part, said lower part being able to be widened in order to increase the stability of the module (1) or of the system obtained from stacking several modules (1). Where appropriate, automatic water recirculation means for recirculating water for the modular irrigation system formed by at least two modules (1) are arranged inside this collection tank (500). As indicated, the incorporation of the conduits (102) in the module (1) makes arrangement of the means required for automatic water recirculation easier, by means of pipes housed in said conduits (102), recirculating it to the irrigation head of the modular system, particularly to a metering-spacer element that will be described below.

There is arranged in the peripheral wall of the upper part of this collection tank (500) a channel (501) suitable for supplying water and nutrients to the tank (500). This channel (501) includes a cover (502) which includes, where appropriate, a through hole for the passage of the cable of the automatic water recirculation means, and prevents the passage of light into the collection tank (500), preventing the growth of unwanted algae and organisms as well as a possible evaporation of the liquid.

Optionally, the lower base of the collection tank (500) includes means to make it easier to move and transport same, such as legs with wheels. Also optionally, the collection tank (500) can house means for measuring the level of liquid accumulated therein, along with, where appropriate, means for providing notification of maximum tank level or any other means making it easier to measure any parameter useful for improving the operation thereof.

Similarly, the collection tank (500) includes in its side walls conduits (102) with two open ends, which are capable of housing cables, water transport pipes, anchoring structures or inner reinforcement elements.

As shown in FIG. 1, the module (1) of the invention, being vertically stackable, can define a modular system in which at least two of the modules (1) described above are stacked vertically on top of one another either directly or by means of interposing a spacer element (110), in either case being fitted inside one another in a leaktight manner to prevent evaporation as much as possible.

The spacer element (110) allows increasing the construction and design capacity of the system, this additional element module (110) also acting as an irrigation flow rate metering and regulating device.

Figure 4:
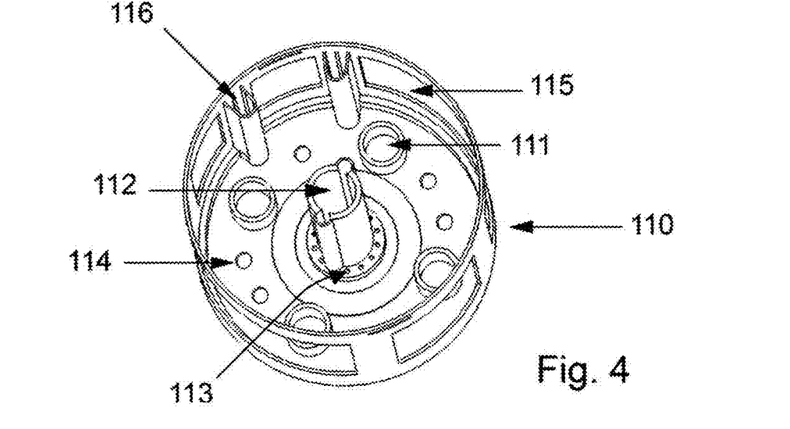
FIG. 4 shows a view of a spacer element.

As seen in FIG. 4, the spacer element (110) is designed based on a container with an open upper end and the diameter of which is adapted to the dimensions of the upper part of the container (2) of the module (1). The peripheral walls of the spacer element (110) will have a sufficient height to house the required amount of water. This spacer element (110) includes in its peripheral walls side holes (115) located in its upper part and the height of which is less than the height of the peripheral walls, to allow access to the inside of said spacer element for arranging plants in cavities (111), for example. Furthermore, the lower base of the spacer element (110) has, arranged at the center, a conduit (112) having a tubular shape or any selected shape, for example, which projects vertically into the module (110) and is closed at its end in contact with the base of said module except for side holes or grooves (113) made adjacent to said end which are arranged at this lower base surrounding the conduit (112) along the perimeter thereof, and suitably sized for regulating the outflow of water therethrough. Therefore, for example, when arranging this spacer element (110) between two modules (1) of a modular system, the central conduit (112) would collect water from the drain of the container (2) of the module (1) and the water would reach the base of this spacer element, filling up the cavities (111) for washing the substrate and excess water will accumulate at the base of the spacer element itself, and the water will then go through drain holes (114) located accordingly at the base of the spacer element (110) for the passage of the water to the module (1) located immediately thereunder.

Like in the case of conduits (102) of the module (1), there are also provided in the spacer element (110) corresponding conduits (116) which are capable of housing elements such as cables, water transport pipes, anchoring or reinforcement elements, etc., arranged inside the peripheral walls of the module (110).

In reference again to FIG. 1, there is incorporated at the lower base of the container (8) described above a reserve tank (400), i.e., which is a space which keeps the irrigation water separated from the substrate once irrigation ends by means of a drainage grate-like spacer element (81), preventing direct contact of the irrigation water with the substrate except for absorbent elements or wicks (82) which allow capturing water contained in the reserve tank (400) by capillarity.

Figure 6:
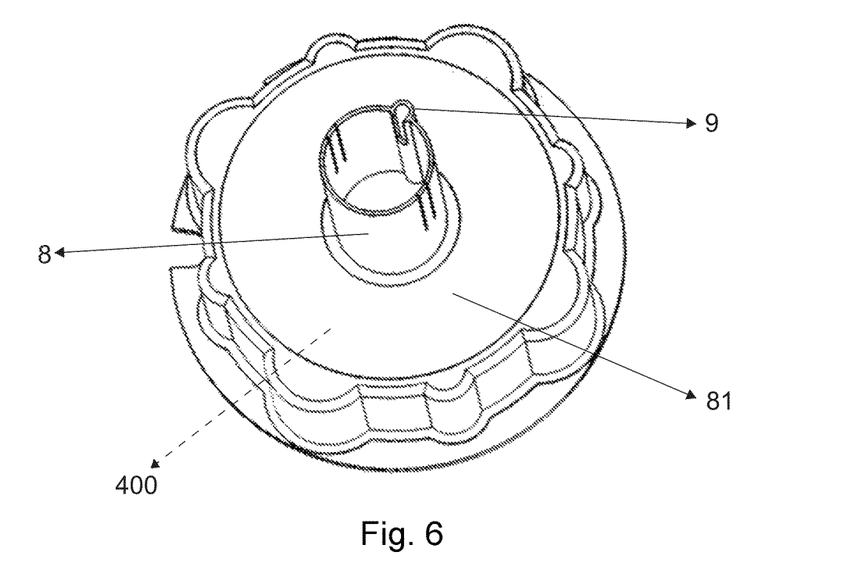
FIG. 6 shows a perspective view of a drainage grate/spacer element according to FIG. 1.

This drainage grate-like spacer element (81) defines an air chamber between the reserve tank (400) and the central tube (9) of the container (2), this air chamber separating the substrate from the water except for the absorbent elements (82) located at the groundwater level of the reserve tank (400), which allow the passage of water from the reserve tank (400) to the substrate, and where appropriate, for draining excess water into the reserve tank. As seen in FIG. 6, the spacer element (81) has a shape that is adapted to the shape of the container (2) housing it and is sized with a size slightly smaller than the size corresponding to said container (2). The spacer element (81) includes a hollow central channel projecting vertically upwards into the container (2) and intended for housing the element (8).

Therefore, when the level of water accumulated in the reserve tank (400) which results from emptying excess water through the container (8) reaches a sufficient level, this water flows through the vertical tubes (200) located at the base of the container (2), reaching the spill level of the central tube (9) and allowing the passage of water to modules (1) or spacer elements (110) located immediately downstream.

Although basically curved shapes are used for the different modules, containers, elements and conduits in the embodiments of the invention that have been shown, these shapes are not limited to the ones described, as it can be polygonal, square, rectangular, etc.

Figure 7:
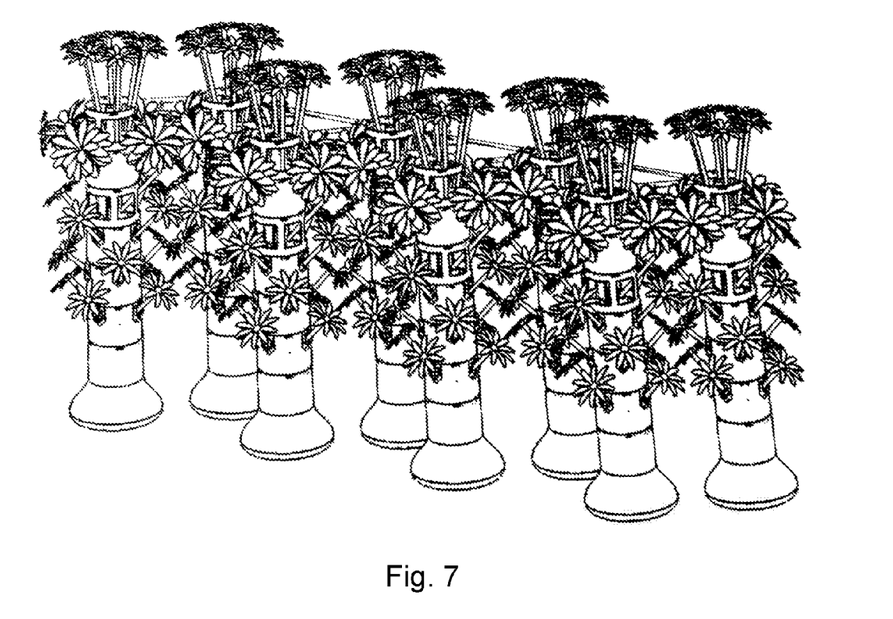
FIG. 7 shows an embodiment of a system according to the invention.
Figure 8:
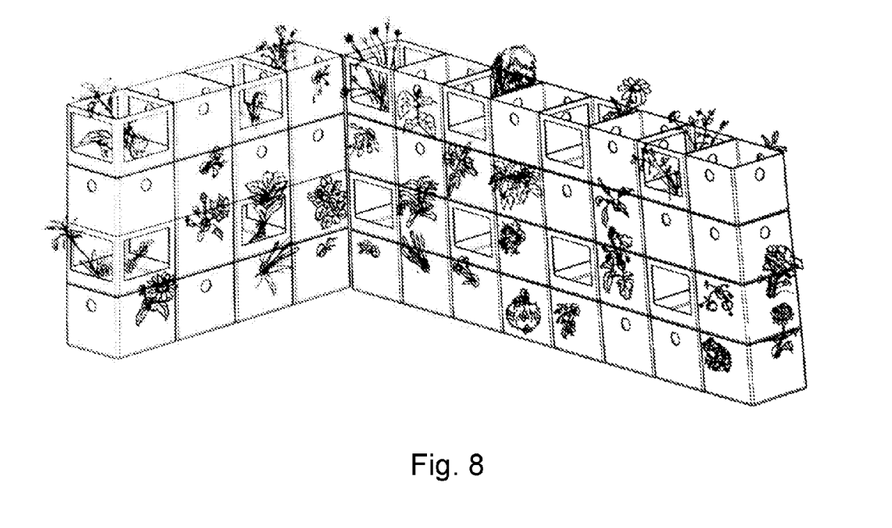
FIG. 8 shows an embodiment of another system according to the invention.

The modular system of the invention offers several construction possibilities, being able to use each module independently or being able to work with a main module, a spacer element in the upper part, several main modules, an upper spacer element and a lower spacer element, or intercalating spacer elements, as shown in FIGS. 7 and 8, for example.

The present invention allows continuous irrigation, cyclically recirculating the irrigation of the modules forming the modular system and installed on top of one another.

This modular system therefore provides a continuous homogenous flow within a closed circuit from one module to the next module arranged immediately thereunder, until finally reaching the first module, without water spilling through any of the side holes and achieving a homogeneous water and/or nutrient distribution, in turn maintaining a water reserve available for use by the plants as needed and preserving and protecting the plants from possible water stress, as well as from extreme temperatures and environmental conditions.

What is claimed is:

1. A vertical modular irrigation container or module comprising:
   a first container intended for housing a substrate for plants and having vertical peripheral walls with one or more side openings for plant growth, and the first container having a lower part and an upper part; and
   inside said first container is arranged at its center a second container with side walls, wherein the side walls are water permeable, a reserve tank and a drainage grated spacer element, wherein
   the second container has therein a tube, with an open upper end, and in a bottom end having one or more through holes which allow water to go through the tube directly to the reserve tank when a water level rises inside the second container and flows into the tube and reaches the one or more through holes; and
   vertical tubes having side walls arranged in the lower part of the first container, the vertical tubes projecting vertically into the reserve tank, the side walls of the vertical tubes being impermeable to direct passage of water, the vertical tubes determining a maximum water fill level in the reserve tank based on a height of the vertical tubes; and
   at least one tubular drain hole at a base of the first container of the module, the at least one tubular drain hole projecting vertically into the first container, a height of the at least one tubular drain hole is greater than the height of the vertical tubes such that when a water flow rate exceeds a capacity of the vertical tubes and the vertical tubes overflow, overflow water will flow through the at least one tubular drain hole to a next lower module, and the water level drops to a reserve water level in the reserve tank once irrigation ends.

2. The vertical modular irrigation container or module according to claim 1, wherein a side wall of the second container is a permeable mesh or barrier.

3. The vertical modular irrigation container or module according to claim 1, wherein circulation of water through an inside of the first container is provided by conduits with two open ends, having a tubular or semi-tubular section, such conduits being arranged inside the said peripheral walls of the module such that the conduits of the said module are aligned.

4. The vertical modular irrigation container or module according to claim 1, wherein the reserve tank consists of a space which keeps the water separated from the substrate once irrigation ends by means of the drainage grated spacer element, preventing direct contact of the water with the substrate except for absorbent elements or wicks which allow capture of water contained in the reserve tank by capillary action.

5. The vertical modular irrigation container or module according to claim 4, wherein the drainage grated spacer element defines an air chamber between the reserve tank and the tube of the second container, the air chamber separating the substrate from the water except for the absorbent elements located in the reserve tank, which allow the passage of water from the reserve tank to the substrate, and for draining excess water into the reserve tank.

6. The vertical modular irrigation container or module according to claim 4, wherein a tubular spacer element has a shape that is adapted to the shape of the second container housing it and is sized with a size smaller than a size corresponding to said second container and includes a hollow central channel projecting vertically upwards into the second container and intended for housing the second container.

7. The vertical modular irrigation container or module according to claim 1, wherein it further includes a water collection tank with peripheral walls formed by a reservoir with an upper part and a lower part, the upper part having a shape similar to a shape of the module, open in the upper part and at least partially closed in the lower part, said lower part being able to be widened in order to increase the stability of the module.

8. The vertical modular irrigation container or module according to claim 7, wherein automatic water recirculation for recirculating water for the modular irrigation container is arranged inside the water collection tank.

9. The vertical modular irrigation container or module according to claim 7, wherein there is arranged in the peripheral walls of the upper part of the collection tank a channel suitable for supplying water and nutrients to the water collection tank.

10. The vertical modular irrigation container or module according to claim 9, wherein the channel includes a cover which includes a conduit to pass a pipe for automatic water recirculation.

11. The vertical modular irrigation container or module according to claim 7, wherein the lower part of the collection tank includes legs with wheels.

12. The vertical modular irrigation container or module according to claim 7, wherein the collection tank can house a device for measuring a level of water accumulated therein, along with, a device for providing a notification of a maximum tank level thereof.

13. The vertical modular irrigation container or module according to claim 7, wherein the collection tank includes in the peripheral walls, conduits with two open ends, which are capable of housing cables, water transport pipes, anchoring structures or inner reinforcement elements.

14. The vertical modular irrigation container or module according to claim 1, wherein it further includes a spacer element which has an open upper end, a diameter which is adapted to dimensions of the upper part of the first container of the module and the spacer element has peripheral walls which have side holes with a height less than a height of the peripheral walls, to allow access to inside of said spacer module for arranging said plants in cavities.

15. The vertical modular irrigation container or module according to claim 14, wherein a lower base having a conduit at its center, said conduit projects vertically into the spacer element and is closed at its end in contact with the lower base of said module except for side holes made adjacent to said end as well as surrounding the conduit along a perimeter thereof, and has holes or grooves at the lower base of the said conduit for regulating an outflow of water therethrough.

16. The vertical modular irrigation container or module according to claim 14, wherein the spacer element further includes corresponding conduits which are capable of housing cables, water transport pipes, anchoring or reinforcement elements arranged inside the peripheral walls of the spacer element.

17. A vertical modular irrigation system of claim 1, wherein it includes at least two modules stacked vertically.

18. The vertical modular irrigation system according to claim 17, wherein it includes at least two modules stacked vertically, wherein at least one of the one or more side openings is used for connecting the at least two modules vertically to one another in order to form meshes, green walls, or vertical gardens.

* * * * *